M. F. KETTLER.
RESILIENT WHEEL.
APPLICATION FILED FEB. 25, 1915.

1,172,610.

Patented Feb. 22, 1916.
3 SHEETS—SHEET 2.

Witnesses

Inventor
M. F. Kettler.
By
Attorneys.

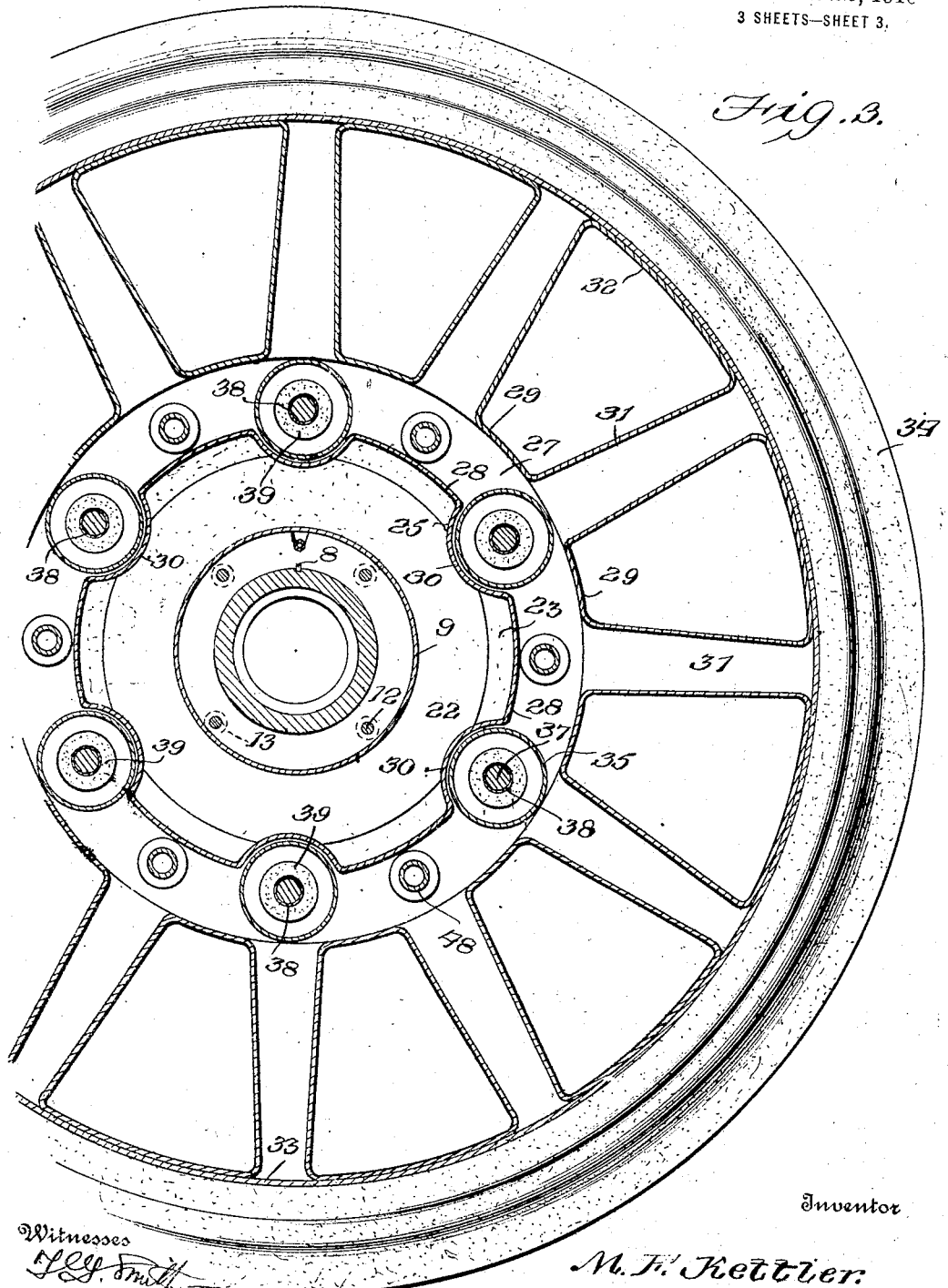

UNITED STATES PATENT OFFICE.

MARTIN F. KETTLER, OF HOUSTON, TEXAS, ASSIGNOR TO DOWNING PNEUMATIC WHEEL COMPANY, OF HOUSTON, TEXAS.

RESILIENT WHEEL.

1,172,610.  Specification of Letters Patent.  Patented Feb. 22, 1916.

Application filed February 25, 1915. Serial No. 10,499.

*To all whom it may concern:*

Be it known that I, MARTIN F. KETTLER, a citizen of the United States, residing at Houston, in the county of Harris and State of Texas, have invented certain new and useful Improvements in Resilient Wheels, of which the following is a specification.

This invention relates to resilient wheels and more particularly to that type embodying a hub, a floating spoke carrying rim, and a pneumatic cushion interposed between the hub and rim.

It is one aim of the invention to so construct and relatively arrange the rim and the pneumatic cushion that the spokes carried by the rim may be of maximum length to render the wheel less clumsy in appearance and the pneumatic cushion may be of maximum cross sectional diameter whereby to secure the desired cushioning effect.

Another aim of the invention is to so construct the rim and cushion that the portion of the cushion which contacts with the rim will not be liable to become worn through.

The invention aims further to disclose a novel construction of floating rim and spokes, these parts being integral and of hollow sheet metal construction.

Figure 1:
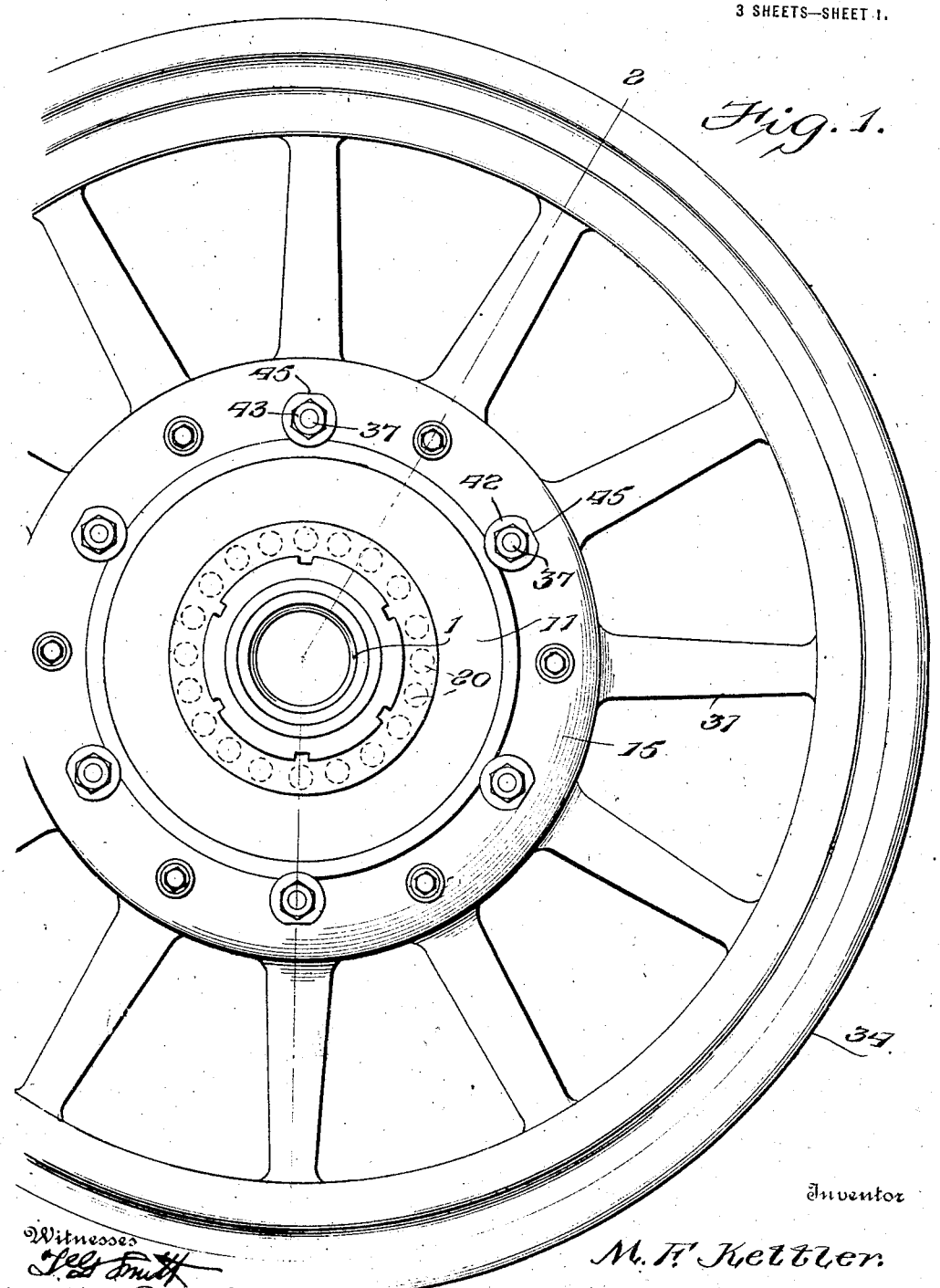
Figure 2:
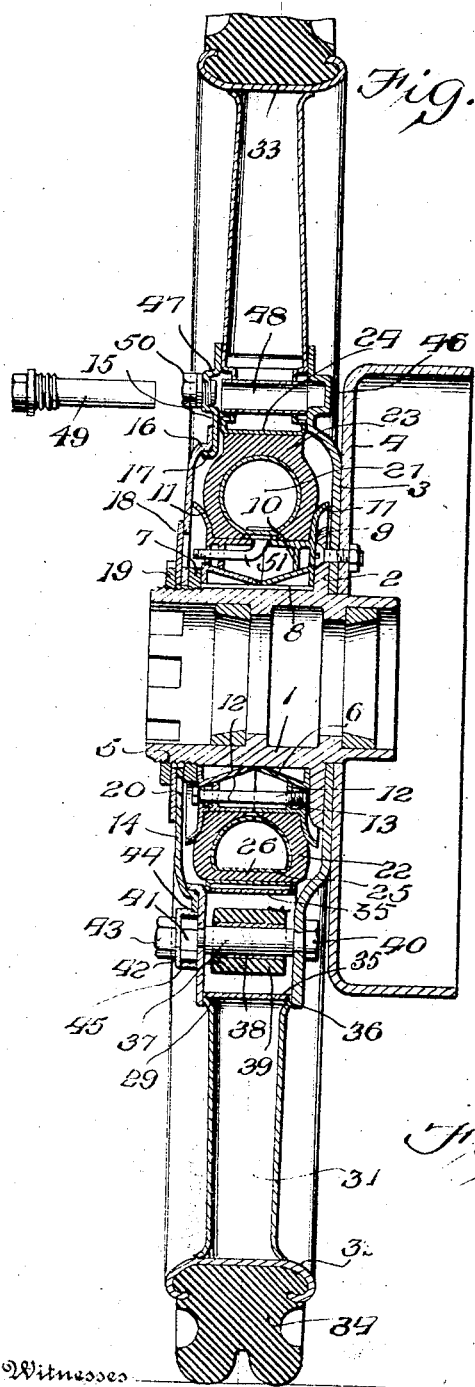
Figure 4:
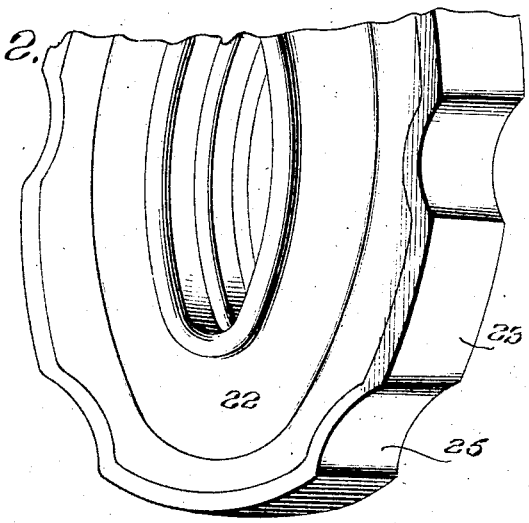
Figure 5:
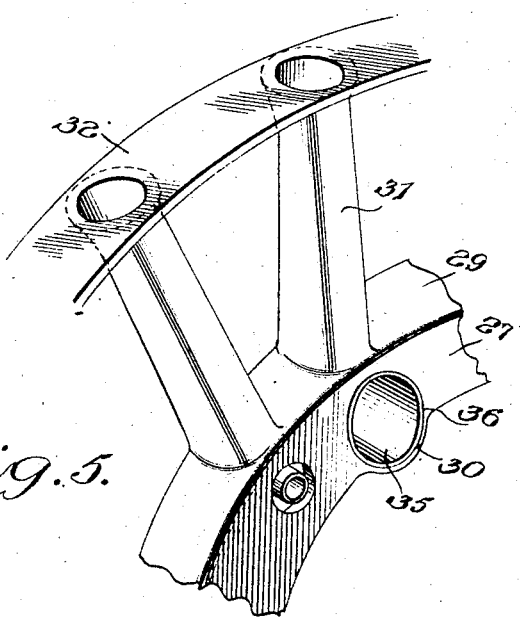

In the accompanying drawings: Figure 1 is a side elevation of the wheel embodying the present invention. Fig. 2 is a vertical transverse sectional view therethrough on the line 2—2 of Fig. 1. Fig. 3 is a vertical sectional view on the line 3—3 of Fig. 2. Fig. 4 is a perspective view of a portion of the pneumatic cushion. Fig. 5 is a perspective view of a portion of the floating rim and spokes carried thereby.

Corresponding and like parts are referred to in the following description and indicated in all the views of the accompanying drawings by the same reference characters.

The wheel embodying the present invention includes a hub 1 which is of the ordinary or any desired construction and this hub has its intermediate portion exteriorly cylindrical and is formed at one end of its said portion with an annular outstanding flange 2, to which is bolted or otherwise secured a casing plate 3 and the web of a brake drum 4. At the other end of its cylindrical intermediate portion the hub is exteriorly screw threaded as at 5 for a purpose to be presently explained. Removably fitted upon the cylindrical portion of the hub is a bearing member comprising conical sections 6 which are so arranged that their minor ends will abut and the major end of one of the sections will abut against the flange 2.

A ring nut 7 is threaded onto the portion 5 of the hub and bears against the major end of the other conical section of the bearing member and a key 8 is provided for connecting the sections for rotation with the hub.

Disposed to surround the bearing member is a seating member for the pneumatic cushion of the wheel, and this seating member comprises assembled annular sections 9, each provided at its outer end with spaced flanges 10 which project inwardly and have their inner edges beveled to conform to the surface of the respective sections of the bearing member. Each section 9 of the seating member is provided with a flange 11 and the pneumatic cushion to be presently described is seated between the flanges and surrounds the said sections. The sections 9 are connected by means of bolts 12 which are secured through their flanges 10 in the manner clearly shown in Fig. 2 of the drawings, and it is preferable that the bolts pass also through spacing collars 13 interposed between the flanges.

The spaces between the flanges constitute lubricant receiving chambers from which lubricant may be supplied to the surfaces of the conical sections of the bearing member, these sections being preferably of bronze metal and the sections comprising the seating member being preferably of steel. The sections of the seating member so fit the sections of the bearing member that the seating member may creep about the said bearing member, and it will be understood that by providing means for supplying lubricant to the contacting surfaces of these two members and by forming one member of bronze metal and the other of steel, wear is reduced to a minimum.

The plate 3 constitutes one side of a casing which houses the pneumatic cushion and the floating spoke rim and the other side of this casing is formed in sections as will now be explained. One section of the last mentioned side of the casing is in the nature of a plate 14 which is removably fitted upon the threaded portion of the hub 1 and rests against the ring nut 7. The other section of the said side of the casing is in the form of an annular plate 15 disposed concentrically with relation to the plate 14 and these two plates are provided respectively with flanges 16 and 17 which engage with each other in the manner shown in Fig. 2 of the drawings. In order that the plate 14 may be held in place upon the hub an annular plate 18 is fitted upon the threaded portion of the hub and bears against the outer side of the plate 14 and a ring nut 19 is threaded upon the said portion of the hub and may be tightened to cause the said plate 18 to firmly bind the plate 14 against the nut 7. For a purpose to be presently explained, the plate 14 is provided with a circular series of openings 20 which are normally covered by the plate 18.

The pneumatic cushion forming a part of the present invention comprises an inner inflatable tube 21 and a casing 22 which is open at its inner side and receives the inflatable tube substantially in the same manner as does the ordinary clencher casing. The inner portion of the casing 22 is received between the flanges 11 of the seating member previously described, and at its outer side the casing is thickened, as indicated at 23, and is exteriorly substantially circumferentially cylindrical, this surface of the casing being indicated at 24. For a purpose which will be presently made clear the thickened portion 23 of the casing of the pneumatic cushion is formed at intervals in its circumference with transverse approximately semi-cylindrical seats or depressions 25 and in order that these seats may be relatively deep it is preferable that the casing at points of location of the seats be of the cross sectional form shown at 26 in Fig. 2 of the drawings. More specifically stated, the seats or depressions 25 extend not only into the thickened portion 23 of the casing but also to a slight extent radially inwardly of this portion.

The floating rim heretofore referred to is of hollow sheet metal construction and includes sides 27, an inner wall 28 and an outer wall 29, the walls 28 and 29 being, generally speaking, concentric to each other and the side walls 27 being parallel to each other. At intervals the wall 28 of the rim is stamped in or otherwise provided with approximately semi-cylindrical seats 30 and the convex sides of these seats rest in the seats or depressions 25 in the cushion 22 in the manner clearly shown in Fig. 3 of the drawings, and it is for this purpose that the seats 25 are provided. Hollow spokes 31 are formed integral with the outer wall 29 of the rim, the said wall 29 constituting an integral connection between the inner ends of the spokes. The outer ends of the spokes are connected by integral web portions 32 which constitute the foundation for the outer or tire carrying rim of the wheel. The web portions 32 constitute curvilinear continuations of the metal comprising the hollow spokes 31.

The outer or tire carrying rim is indicated by the numeral 33 and may be of any desired form and this rim is disposed to surround the outer ends of the spokes 31 and the connecting web portions 32 and is secured in place by welding or any other suitable method or means. This rim supports an ordinary rubber tire 34.

In order that the floating spoke rim may be connected for rotation with the casing plates and hub, sleeves 35 are arranged at intervals within the said floating rim and have open ends which are secured within openings 36 formed in the side walls 27 of the said rim. These sleeves are relatively large in diameter and their inner sides are received within the seats 30 formed in the inner wall of the said rim, their outermost sides substantially touching the circle described by the outer wall 29 of the rim. Bolts 37 are secured through the casing plate 3 and the section 15 of the other casing plate, and these bolts extend through the sleeves 35 and each bolt has rotatably fitted upon its intermediate portion a sleeve 38 of bronze metal carrying a soft rubber buffer 39 which is secured to the sleeve in any suitable manner. The buffers 39 are externally of a diameter less than the internal diameter of the respective sleeves 35, and it will be understood that when the hub is rotated rearwardly or forwardly, the buffers will be brought into contact with the walls of the respective sleeves for the purpose of connecting the floating rim with the casing plates and hub. Nuts 40 and 41 are threaded onto the bolts 37 and bear respectively against the outer face of the casing plate 3 and the outer face of the section 15 of the other casing plate, and in order that the section 14 of the last mentioned casing plate may be secured at its periphery to the section 15 thereof, locking collars 42 are provided and are rotatably mounted upon the outer ends of the bolts 37 and are held in place by means of nuts 43 threaded upon the said ends of the bolts. Each locking collar has a flange provided at one side with a shoulder 44 designed in one position of the collar to engage with and bind the edge of the plate 14 against the outer face of the plate 15 and each flange at its opposite side is flattened as at 45 so that when the nut 43 is loosened, the respective collar may be moved outwardly and then rotated to present its flattened side 45 to the periphery of the plate 14 so as to permit of removal of this plate after the plate 18 and nut have been removed and without the necessity of entirely removing the nuts 43 and their respective locking collars. From the foregoing it will be apparent that by providing the seats 25 in the pneumatic cushion and the seats 30 in the inner wall 28 of the floating rim, the sleeves 35 may be located nearer the hub than would otherwise be possible unless the pneumatic cushion were of considerably less diameter than here shown. For this reason the spokes 31 may be of maximum length and the floating rim may be of minimum diameter and, on the other hand, the sleeve 35 may be of maximum diameter as also the pneumatic cushion. This compact arrangement of the parts renders the wheel less bulky and clumsy in appearance and yet the desired cushioning effect is obtained.

It will furthermore be apparent from the foregoing that due to the peculiar construction of the floating rim and spokes and the manner in which the inner and outer ends of the spokes are connected, an extremely light and yet strong structure is obtained.

In the event that the pneumatic cushion for any reason becomes deflated, it is necessary or at least desirable to have the floating rim and hub connected in such manner that the two will rotate in unison. In order that this may be accomplished the casing plate 3 is formed at intervals with stamped out seats 46, the casing plate section 15 is formed with threaded apertures 47, the sleeves 48 are arranged at corresponding intervals circumferentially within the floating rim and extend at their ends through the side walls thereof, and a bolt 49, such as shown in Fig. 2 of the drawings, may be fitted through each aperture 47, sleeve 48, and at its end into the coresponding socket or seat 46, the bolt being threaded adjacent its headed end so as to thread into the opening 47. When these bolts are not in use a threaded plug 50 is employed for the purpose of closing the apertures 47.

In order that the inflatable tube 21 may be inflated, there is provided a valve having a stem 51 extending laterally through the flanges 10 of one of the sections of the seating member and adapted to have its open end located opposite one or another of the openings 20 in the casing plate section 14. It will be apparent that by removing the nut 19 and the plate 18 a pump tube may be applied to this valve stem and that after the inner tube has been inflated, the plate 18 may be again fitted into place so as to cover the openings.

Having thus described the invention, what is claimed as new is:

1. In a wheel of the class described, a hub, casing plates carried by the hub, a floating spoke rim disposed between the casing plates, the rim being formed interiorly at intervals with seats extending inwardly from its inner side, abutment members housed within the rim and in said seats, buffer members carried by the said casing plates and coöperating with said abutment members, and a pneumatic cushion interposed between the rim and hub and having depressions receiving the said seats upon the rim.

2. In a wheel of the class described, a hub, casing plates carried by the hub, a hollow floating spoke rim disposed between the casing plates, the rim being formed interiorly at intervals with seats bulging inwardly from its inner side, abutment sleeves housed within the rim and partly within the said seats, buffer members carried by said casing plates and coöperating with said abutment sleeves, and a pneumatic cushion interposed between the rim and hub and having depressions receiving said seats upon the rim.

3. In a wheel of the class described, a hub, casing plates carried by the hub, a floating spoke rim disposed between the casing plates, the rim being formed interiorly at intervals with seats extending inwardly from its inner side, abutment members housed within the rim and in said seats, buffer members carried by the said casing plates and coöperating with said abutment members, and a pneumatic cushion interposed between the rim and hub, that portion of the cushion which contacts with the rim being thickened and being formed with depressions receiving the said seats of the rim.

4. In a wheel of the class described, a hub, casing plates caried by the hub, a floating spoke rim disposed between the casing plates, the rim being formed interiorly at intervals with substantially semi-cylindrical seats projecting inwardly from its inner side in the direction of the axis of the wheel, abutment sleeves disposed within the concavities of the seats, buffer members carried between the casing plates and extending within the said sleeves and of a diameter less than the diameter of the sleeves, and a pneumatic cushion interposed between the rim and hub and having its periphery formed at intervals to receive the said seats upon the rim.

5. In a wheel of the class described, a hub, casing plates carried by the hub, a floating spoke rim surrounding said hub, the rim being formed interiorly at intervals with portions bulged in the direction of the axis thereof, abutment members disposed within the concavities of the said bulged portions and within the said rim, buffer members carried by the casing plates and arranged for coöperation with the abutment members, and a pneumatic cushion interposed between the rim and the hub and formed in its outer periphery with transverse depressions receiving the bulged portions of the said rim.

In testimony whereof I affix my signature in presence of two witnesses.

MARTIN F. KETTLER. [L. S.]

Witnesses:
 Geo. W. Schmitz,
 T. W. Andrews.